(12) United States Patent
Zhidkov et al.

(10) Patent No.: US 8,000,417 B1
(45) Date of Patent: Aug. 16, 2011

(54) METHODS AND OFDM RECEIVERS PROVIDING INTER-CARRIER INTERFERENCE CANCELLATION WITH GUARD INTERVAL REUSE SCHEME

(75) Inventors: Sergey Zhidkov, Suwon-si (KR); Jinhee Cheon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 822 days.

(21) Appl. No.: 11/945,763

(22) Filed: Nov. 27, 2007

(51) Int. Cl.
*H03D 1/04* (2006.01)

(52) U.S. Cl. ........ 375/346; 375/229; 375/230; 375/231; 375/232; 375/233; 375/260; 375/316; 375/340; 375/348

(58) Field of Classification Search .......... 375/229–233, 375/260, 316, 346, 348
See application file for complete search history.

(56) References Cited

U.S. PATENT DOCUMENTS

| | | | |
|---|---|---|---|
| 5,357,502 A * | 10/1994 | Castelain et al. ............. | 370/210 |
| 7,190,734 B2 * | 3/2007 | Giannakis et al. ............ | 375/267 |
| 7,613,101 B2 * | 11/2009 | Suda et al. .................... | 370/203 |
| 7,706,428 B2 * | 4/2010 | Wilhelmsson et al. ....... | 375/144 |
| 7,773,683 B2 * | 8/2010 | Tseng et al. .................. | 375/260 |
| 2005/0276337 A1 * | 12/2005 | Khan ............................. | 375/260 |
| 2006/0239367 A1 * | 10/2006 | Wilhelmsson et al. ....... | 375/260 |

FOREIGN PATENT DOCUMENTS

| | | |
|---|---|---|
| JP | 11-239115 | 8/1999 |
| JP | 2001-313626 | 11/2001 |
| KR | 10-2004-0100536 A | 12/2004 |
| KR | 10-2006-0065355 A | 6/2006 |

OTHER PUBLICATIONS

P. Schniter, "Low-complexity Equalization of OFDM in Doubly Selective Channels," IEEE Trans. Signal Processing, vol. 52, No. 4, Apr. 2004, pp. 1002-1011.

Y. Mostofi, D.C. Cox, "ICI Mitigation for Pilot-Aided OFDM Mobile Systems," IEEE Trans. Communications, vol. 4, No. 2, Mar. 2005.

Jean-Paul Linnartz, A. Filippi, S.A. Husen, S. Baggen, "Mobile reception of DVB-H: how to make it work?", 3rd IEEE BENELUX/DSP Valley Signal Processing Symposium SPS-DARTS 2007, Antwerp, Mar. 21-22, 2007.

S.A. Husen, S. Baggen, M. Stassen, H.Y. Tsang, "Simple Doppler compensation for DVB-T", 25-th Symposium on Information Theory in the Benelux, The Netherlands, Jun. 2-4, 2004.

Luca Rugini, Paolo Banelli, and Geert Leus, "Simple Equalization of Time-Varying Channels for OFDM," IEEE Communications Letters, vol. 9, No. 7, Jul. 2005.

C. Oria, et al., "Optimum Doppler compensation scheme for DVB-H receivers," Electronics Letters, Jun. 22, 2006 vol. 42 No. 13.

K.Schmidt, C. Gunter, A. Rothermel, "Improving the mobility of dvb handheld devices with inter-carrier interference compensation," Consumer Electronics, 2004 IEEE International Symposium on Sep. 1-3, 2004.

* cited by examiner

*Primary Examiner* — Chieh M Fan
*Assistant Examiner* — Sophia Vlahos
(74) *Attorney, Agent, or Firm* — Myers Bigel Sibley & Sajovec (57) ABSTRACT

An OFDM (orthogonal frequency-division multiplexing) receiver circuit can include a GI (Guard Interval) combiner circuit that is configured to adaptively combine data in the GI of an OFDM formatted signal with data included in a predetermined section of an active OFDM symbol.

12 Claims, 9 Drawing Sheets

FIG. 1

PRIOR ART

METHODS AND OFDM RECEIVERS PROVIDING INTER-CARRIER INTERFERENCE CANCELLATION WITH GUARD INTERVAL REUSE SCHEME

FIELD OF THE INVENTION

The present invention relates to the field of digital communications, and more particularly, to methods and receivers for performing inter-carrier interference (hereinafter, referred to as the ICI) cancellation.

BACKGROUND

OFDM (Orthogonal Frequency-Division Multiplexing) is becoming widely used in wireless communication systems due to its efficient implementation and its robustness with regard to multi-path fading. Recently, OFDM has been adopted as a primary modulation technique for some mobile TV systems, such as Korean terrestrial digital multimedia broadcasting (T-DMB), European digital video broadcasting for handheld devices (DVB-H), and MediaFLO mobile-TV system deployed in United States.

One problem in mobile TV applications is mobile signal reception in, such as cars, buses, high-speed trains and so on. In such situations, the receiver should accurately estimate time-varying channel response. This is typically accomplished by adding to the OFDM signal a predefined number of scattered pilot cells, which are uniformly distributed in the time and frequency domains.

However, even though the channel estimation may be accurate, the performance of the OFDM receiver in time-varying channels can be limited by the ICI effect introduced by channel response variation during the duration of one OFDM symbol. One approach to this problem is to use an OFDM system with a shorter OFDM symbol duration to improve mobile performance. Another approach is to use dedicated ICI cancellation circuits or a special form of the channel equalizers that take into account the time-varying effect of the channel within the duration of one OFDM symbol, as discussed, for example, in references [1] and [3]-[7] listed herein.

Figure 1:
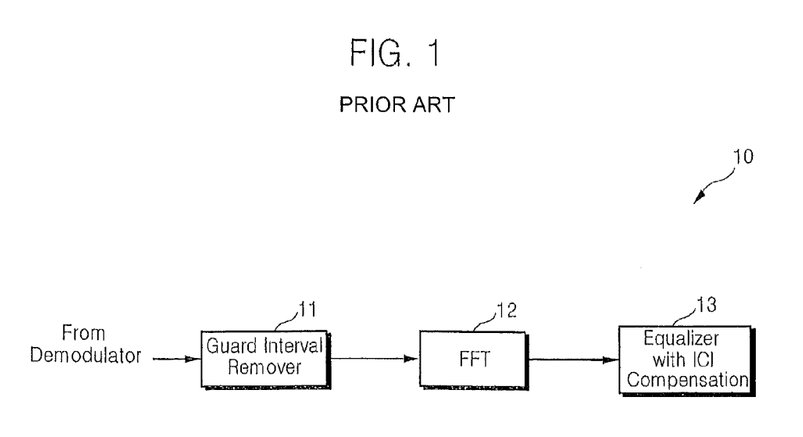
FIG. 1 is a functional block diagram of a conventional OFDM receiver.

FIG. 1 is a functional block diagram showing the structure of a conventional OFDM receiver using a special form of the channel equalizers. Referring to FIG. 1, in a conventional OFDM receiver 10, a signal that is up-converted by an OFDM transmitter (not shown) is down-converted by a down-converter (not shown) and an analog-to-digital converter (not shown) converts the down-converted signal to a digital signal and outputs the digital signal to a GI (guard internal) remover 11. The GI remover 11 removes from the input digital signal a guard interval inserted by the OFDM transmitter to estimate channels. The signal output from the GI remover 11 is converted to a frequency domain signal by an FFT (Fast Fourier Transform) portion 12. The ICI of the signal converted to the frequency domain can be canceled or compensated for by an equalizer 13. The OFDM receiver 10 may further include a decoder (not shown) to decode a signal output from the equalizer 13.

Figure 2:
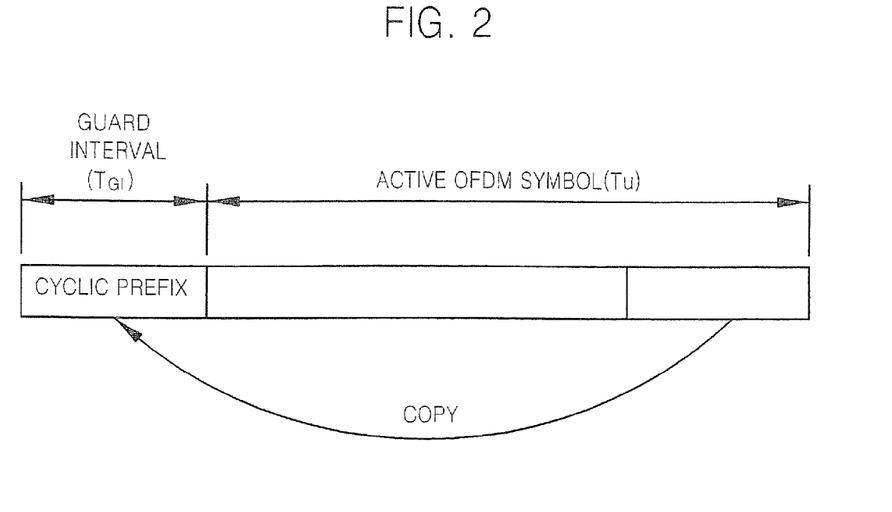
FIG. 2 shows a typical GI insertion scheme.

FIG. 2 shows a GI insertion scheme. Referring to FIG. 2, predetermined data at the rear portion of the original OFDM symbol is copied to be used in the GI. Thus, the OFDM symbol consists of the GI and an active OFDM symbol that is referred to as an effective OFDM symbol. Typically, GI($T_{GI}$) is about ¼, ⅛, or 1/16 of an active OFDM symbol section ($T_U$).

The OFDM transmitter generates the OFDM symbol of FIG. 2 and continuously transmits the generated symbol. Then the OFDM receiver as shown in FIG. 1 continuously receives the OFDM symbol of FIG. 2 to process each OFDM symbol. The OFDM receiver discards the GI from each OFDM symbol.

When a multi-path delay-spread is shorter than the GI, the OFDM system may be able to handle the multi-path echo. Thus, the GI can be selected as a sufficiently long section to reduce degradation of performance in a channel with a long echo. A very long echo can be intentionally generated in a network referred to as a single frequency network (SFN). In the SFN, the same information is broadcasted by many transmitters using the same frequency to increase the effective coverage domain without increasing the power of a transmitter. In this case, a user can receive two signals having almost the same size but different delays.

Therefore, a system designed for an SFN operation may handle a worst case delay time difference between two arrival paths. For example, a DVB-T SFN network may exceed the worst case delay time of 200 µs. Thus, a long GI may be used to reduce the performance degradation in the case worst scenario. In particular, many systems use a GI that is ¼ of the active OFDM symbol to reduce the performance degradation in the case worst scenario.

In a normal environment, the multi-path delay-spread may be much shorter than the worst case scenario. For example, the multi-path delay may be generally shorter than 10 µs in digital TV channels. Thus, in a normal channel environment, the OFDM system designed for the worst case situation may actually cause loss in transmission speed or signal-to-noise ratio (SNR) due to the transmission of a long extra cyclic prefix that is disregarded in the receiver.

References referred to herein include:

[1] P. Schniter, "Low-complexity Equalization of OFDM in Doubly Selective Channels," IEEE Trans. Signal Processing, Vol. 52, No.4, April, 2004, pp.1002-1011

[2] Y. Mostofi, D. C. Cox, "ICI Mitigation for Pilot-Aided OFDM Mobile Systems," IEEE Trans. Communications, Vol.4, No. 2, March, 2005

[3] Jean-Paul Linnartz, A. Filippi, S. A. Husen, S. Baggen, "Mobile reception of DVB-H: how to make it work?", 3rd IEEE BENELUX/DSP Valley Signal Processing Symposium SPS-DARTS 2007, Antwerp, Mar. 21-22, 2007

[4] S. A. Husen, S. Baggen, M. Stassen, H. Y. Tsang, "Simple Doppler compensation for DVB-T", 25-th Symposium on Information Theory in the Benelux, The Netherlands, Jun. 2-4, 2004

[5] Luca Rugini, Paolo Banelli, and Geert Leus, "Simple Equalization of Time-Varying Channels for OFDM," IEEE COMMUNICATIONS LETTERS, VOL. 9, NO. 7, July 2005

[6] C. Oria, et al., "Optimum Doppler compensation scheme for DVB-H receivers," ELECTRONICS LETTERS, 22 Jun. 2006 Vol. 42 No. 13

[7] K. Schmidt, C. Gunter, A. Rothermel, "Improving the mobility of dvb handheld devices with inter-carrier interference compensation," Consumer Electronics, 2004 IEEE International Symposium on Sep. 1-3, 2004

SUMMARY

Embodiments according to the present invention can provide receivers with improved SNR by reusing a GI of a signal with the GI. In some embodiments according to the invention, signal receivers and methods can use a conventional ICI cancellation scheme while reusing a GI of a signal with the GI.

In some embodiments according to the invention, an OFDM (orthogonal frequency-division multiplexing) receiver comprises a GI (guard interval) combiner combining a signal of at least a portion of a GI included in an OFDM received signal and a signal of a duplicate section corresponding to the at least the portion of the GI and outputting the combined signal, an FFT (fast Fourier transform) portion receiving a signal output from the GI combiner, converting the received signal to a frequency domain, and outputting the converted signal, a channel parameter estimator estimating a channel parameter value changed according to a combined signal combined by the GI combiner, and an equalizer equalizing the signal output from the FFT portion based on the signal output from the channel parameter estimator.

In some embodiments according to the invention, the OFDM receiver further comprises a channel delay estimator estimating a channel delay of the OFDM received signal, wherein the channel parameter estimator receives information on the at least the portion of the signal in the GI from at least one of the channel delay estimator and the GI combiner.

In some embodiments according to the invention, each of the duplicate section and the GI is divided into M-number of sections, where M is a natural number not less than 1, and the GI combiner comprises a weighting coefficient estimator producing a weighting coefficient corresponding to each section of the duplicate section, and a combining circuit combining a signal of each section of the duplication section with a signal of the GI corresponding thereto using the weighting coefficient and outputting the combined signal.

In some embodiments according to the invention, the weighting coefficient is determined to be a value that maximizes a signal-to-noise ratio of the combined signal. In some embodiments according to the invention, the channel parameter estimator estimates the changed channel parameter value by an equation $$\xi_q = \frac{1+e^{-j\frac{2\pi q N'_{GI}}{N}}}{2\left[e^{j\frac{2\pi q}{N}}-1\right]},$$

where $N'_{GI}$ is the length of a section corresponding to the at least a portion of the signal of the GI. In some embodiments according to the invention, the equalizer comprises an ICI cancellation circuit that includes at least one of a serial Minimum Mean Square Error (MMSE), a full-MMSE, an L-order MMSE, and a DFE (decision feedback equalizer).

In some embodiments according to the invention, an OFDM (orthogonal frequency-division multiplexing) receiving method comprises combining a signal of at least a portion of a GI (guard interval) included in an OFDM received signal and a signal of a duplicate section corresponding to the at least the portion of the GI and outputting the combined signal, estimating a channel parameter value changed according to a combined signal, and equalizing a signal including the combined signal based on the estimated channel parameter value.

In some embodiments according to the invention, the OFDM receiving method further comprises estimating channel delay of the OFDM received signal, and determining the at least the portion of the signal of the GI based on a result of the estimation.

In some embodiments according to the invention, each of the duplicate section and the GI is divided into M-number of sections, where M is a natural number not less than 1, and the combining of the signals comprises producing a weighting coefficient corresponding to each section of the duplicate section, and combining a signal of each section of the duplication section with a signal of the GI corresponding thereto using the weighting coefficient and outputting the combined signal.

In some embodiments according to the invention, the weighting coefficient is determined to be a value that maximizes a signal-to-noise ratio of the combined signal.

In some embodiments according to the invention, the estimating of the changed channel parameter value includes operation of an equation $$\xi_q = \frac{1+e^{-j\frac{2\pi q N'_{GI}}{N}}}{2\left[e^{j\frac{2\pi q}{N}}-1\right]},$$

where $N'_{GI}$ is the length of a section corresponding to the at least a portion of the signal of the GI.

In some embodiments according to the invention, the equalizer comprises an ICI cancellation circuit that includes at least one of a serial MMSE, a full-MMSE, an L-order MMSE, and a DFE (decision feedback equalizer).

In some embodiments according to the invention, the present invention provides a recording medium recording a computer program to perform any of the above-described methods.

In some embodiments according to the invention, the SNR is improved because the data of GI is not simply canceled but reused. Thus, an error rate of a received signal is lowered and reliability of the signal receiver is improved. Also, since the conventional ICI cancellation scheme can be simultaneously used with the above scheme of reusing a GI of a signal with the GI, the GI reuse scheme can be easily applied to time-varying channels, that is, mobile channels and performance of the signal receiver can be improved.

DESCRIPTION OF EMBODIMENTS
ACCORDING TO THE INVENTION

The invention now will be described more fully hereinafter with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

Moreover, when an element is referred to as being "responsive" to another element, it can be directly responsive to the other element, or intervening elements may be present. In contrast, when an element is referred to as being "directly responsive" to another elements, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The invention is also described using block diagrams. It will be understood that each block, and combinations of blocks, can be implemented by computer program instructions. These program instructions may be provided to a processor circuit, such as a microprocessor, microcontroller or other processor, such that the instructions which execute on the processor(s) create means for implementing the functions specified in the block or blocks. The computer program instructions may be executed by the processor(s) to cause a series of operational steps to be performed by the processor(s) to produce a computer implemented process such that the instructions which execute on the processor(s) provide steps for implementing the functions specified in the block or blocks.

Accordingly, the blocks support combinations of means for performing the specified functions, combinations of steps for performing the specified functions and program instruction means for performing the specified functions. It will also be understood that each block, and combinations of blocks, can be implemented by special purpose hardware-based systems which perform the specified functions or steps, or combinations of special purpose hardware and computer instructions.

It should also be noted that in some alternate implementations, the functions/acts noted in the blocks may occur out of the order noted in the figures. For example, two blocks shown in succession may in fact be executed substantially concurrently or the blocks may sometimes be executed in the reverse order, depending upon the functionality/acts involved.

The computer program instructions may be stored in a computer-readable memory that can direct a computer or other programmable data processing apparatus to function in a particular manner, such that the instructions stored in the computer-readable memory produce an article of manufacture including instruction means which implement the function specified in the block diagrams.

A transmitted OFDM signal can be represented as:

$$S_n = \sum_{l=0}^{N-1} S_l e^{j2\pi n l/N}, n = 0, 1, \ldots N-1. \quad \text{[Equation 1]}$$

In Equation 1, $\{S_l\}$ is the transmitted QAM symbols in the frequency domain, and N is the DFT length. When the transmitted OFDM signal is received through a multi-path channel that is time-varying, the OFDM signal can be given by $$r_n = \sum_{m=0}^{N-1} h_m(n) s_{n-m} + w_n, n = 0, 1, \ldots N-1 \quad \text{[Equation 2]}$$

where $h_m(n)$ is the channel impulse response at time instant n. The signal shown in Equation 2 may pass through predetermined down-converting and analog-to-digital converting (ADC) processes.

A digital signal after the digital converting can be expressed as $r_k$. In the conventional OFDM receiver, the digital signal is input to the GI remover and a GI inserted at the end of an OFDM transmission is discarded. However, in some embodiments according to the present invention, the GI is input to a GI combiner to be reused as described herein. As extra information included in the GI section is reused, such as channel response information or noise, the performance of the OFDM system can be improved. Of many methods with regard to the GI reuse scheme, one of the methods is described below. For example, the OFDM receiver can use a GI combiner circuit 110 of FIG. 8 instead of the GI remover 11 of FIG. 1.

Figure 3:
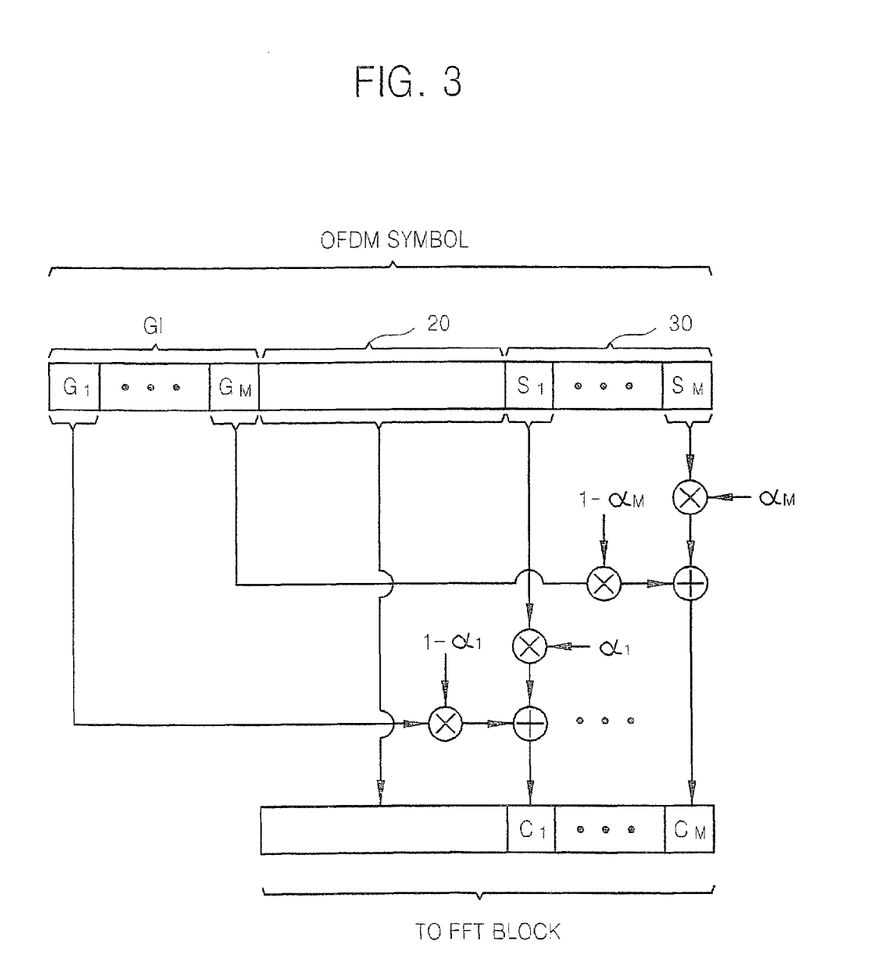
FIG. 3 illustrates a basic operation of a GI combiner circuit in some embodiments according to the invention.

FIG. 3 illustrates operations of a GI combiner circuit in some embodiments according to the invention. Referring to FIG. 3, the GI combiner 110 does not discard data in a GI but adaptively combines the data in the GI with the data in a predetermined section 30 of an active OFDM symbol. The data in the GI is a copy of the data of the predetermined section 30 of the active OFDM symbol. For the convenience of explanation, it is assumed that the predetermined section 30 of the active OFDM symbol section is a duplicate section and a section 20 except for the duplicate section is a non-duplicate section.

The GI of the OFDM symbol is divided into M-number of sections $G_1, \ldots, G_M$. The duplicate section 30 is also divided into M-number of sections $S_1, \ldots, S_M$. Each of the sections has corresponding weighting coefficients $\alpha_1, \ldots, \alpha_m$. The weighting coefficients $\alpha_1, \ldots, \alpha_m$ can be obtained by a weighting coefficient estimator circuit, the function of which is described herein. Samples of the GI sections $G_1, \ldots, G_M$ in the GI are combined with samples of corresponding sections $S_1, \ldots, S_M$ in the duplicate section 30 of the OFDM symbol using the estimated weighting coefficients $\alpha_1, \ldots, \alpha_m$. The combination equation can be expresses as follows.

$$c_k^{(m)} = \alpha_m s_k^{(m)} + (1-\alpha_m) g_k^{(m)} \quad \text{[Equation 3]}$$

In Equation 3, $\alpha_m$ is the weighting coefficient of the m-th section, k is an index to indicate a signal sample of the m-th section, $s_k^{(m)}$, $g_k^{(m)}$, and $c_k^{(m)}$ are, respectively, the sample of the m-th section of the duplicate section, the sample of the m-th section of the GI, and a combined sample of the samples. Also, m is an index to indicate the section that is a natural number from 1 to M where M is a natural number not less than 1.

The weighting coefficients $\alpha_1, \ldots, \alpha_m$ are selected such that the SNR of the samples in the duplicate section 30 are maximized. The samples in the non-duplicate section 20 do not need to be combined with the samples in the GI. Thus, the weighting coefficient applied to the non-duplicate section 20 is 1.

Figure 4:
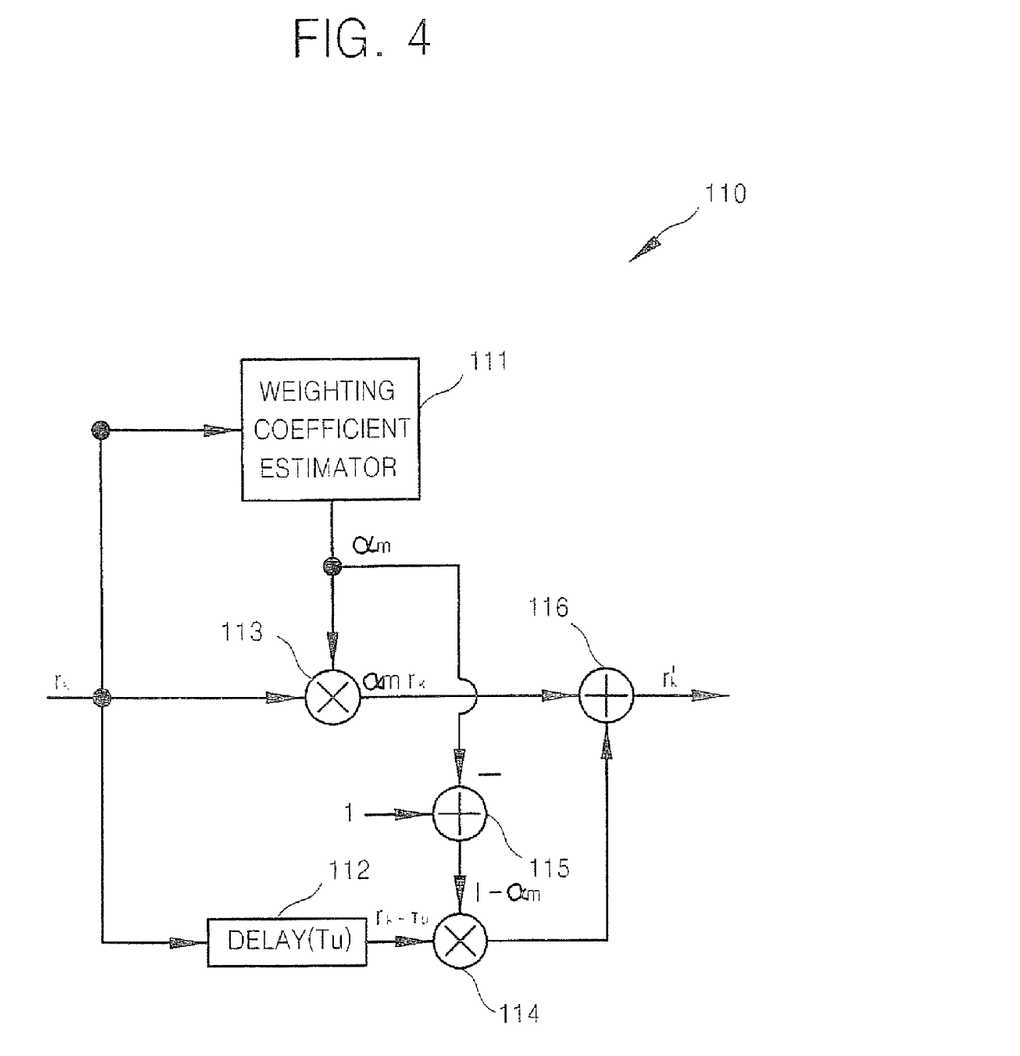
FIG. 4 is a block diagram of a GI combiner circuit in some embodiments according to the invention.

FIG. 4 is a functional block diagram of a GI combiner 110 according to an embodiment of the present invention. Referring to FIG. 4, the GI combiner 110 includes a weighting coefficient estimator 111 and a combining circuit. The weighting coefficient estimator 111 produces weighting coefficients used for reuse of a signal in the GI. The combining circuit is configured to output a combined signal by combining the signal of each section of the duplicate section to a signal in the corresponding GI using the weighting coefficient. The combining circuit includes a delayer 112, multipliers 113 and 114, and adders 115 and 116.

In detail, the weighting coefficient estimator 111 outputs 1 as a weighting coefficient to the samples in the non-duplicate section 20. Thus, the samples in the non-duplicate section 20 are not changed by the GI combiner 110. Also, the weighting coefficient estimator 111 produces weighting coefficients $\alpha_1, \ldots, \alpha_m$ to each section of the duplicate section 30 and the GI so that the SNR of the samples in the duplicate section 30 of the OFDM signal is maximized. That is, the weighting coefficient estimator 111 selects coefficients suitable for each section of the GI such that the SNR of an output signal of the GI combiner 110 is maximized. For example, in consideration of the signal samples $g_k^{(m)}$ belonging to the m-th GI section and the signal samples in the duplicate section corresponding thereto, that is, the original signal samples $s_k^{(m)}$, these signals can be expressed as follows.

$$s_k^{(m)} = x_k^{(m)} + n_k^{(m)}$$

$$g_k^{(m)} = x_k^{(m)} + n'_k^{(m)} \quad \text{[Equation 4]}$$

In Equation 4, $x_k^{(m)}$ is the OFDM signal having no noise or multi-path and $n'_k^{(m)}$ and $n_k^{(m)}$ are noise components in the m-th section of the GI and the corresponding section of the duplicate section 30 of the OFDM signal, respectively. That is, $n'_k^{(m)} \neq n_k^{(m)}$. This is because the GI sections are affected by a multi-path component (a delay component of a preceding OFDM signal). Thus, the multi-path component that is not compensated is considered as an additional noise source in the $n'_k^{(m)}$. The signal $c_k^{(m)}$ obtained by combing the signal samples $g_k^{(m)}$ belonging to the m-th GI section and the original signal samples $s_k^{(m)}$ can be expressed as follows.

$$c_k^{(m)} = x_k^{(m)} + \alpha_m n_k^{(m)} + (1-\alpha_m) n'_k^{(m)} \quad \text{[Equation 5]}$$

In some embodiments according to the invention, the weighting coefficient $\alpha_m$ is selected such that the total noise intensity $(\alpha_m n_k^{(m)} + (1-\alpha_m) n'_k^{(m)})$ in the combined signal $c_k^{(m)}$ is minimized. That is, the weighting coefficient $\alpha_m$ satisfying Equation 6 is selected.

$$\min_{\alpha_m} \sigma_{tot}^2 \quad \text{[Equation 6]}$$

In Equation 6, $\sigma_{tot}^2$ is a total noise variance and thus $\sigma_{tot}^2 = \alpha_m \sigma_{ref,m}^2 + (1-\alpha_m) \sigma_m^2$. Also, $\sigma_{ref,m}^2$ and $\sigma_m^2$ are the noise variance of the m-th section of the duplicate section 30 and the noise variance in the m-th section of the GI, respectively, which are $$\sigma_{ref,m}^2 = E[|n_k^{(m)}|^2]$$

and $$\sigma_m^2 = E[|n'^{(m)}_k|^2].$$

Since there may be noise in the GI due to the multi-path, the noise variance can vary according to the section. However, it can be assumed that the noise variance in the section other than the GI, that is, the non-duplicate section 20 or the duplicate section 30, is about the same regardless of the section. Thus, $\sigma_{ref,m}^2$ can be expressed as $\sigma_{ref}^2$. The $\sigma_{ref}^2$ is referred to as a background noise variance.

The weighting coefficient $\alpha_m$ satisfying Equation 6 can be obtained by Equation 7.

$$\alpha_m = \frac{\sigma_m^2}{\sigma_m^2 + \sigma_{ref}^2} \quad \text{[Equation 7]}$$

The noise variance $(\sigma_{est}^2 = \sigma_m^2 + \sigma_{ref}^2)$ in Equation 7 can be estimated using the samples in the GI and the duplicate section. In detail, the noise variance $\sigma_{est}^2$ can be estimated by averaging the square of the difference between all samples in the m-th section of the GI and the samples in the duplicate section corresponding thereto, that is, the original samples, as shown in Equation 8. The average is preferably performed to a plurality of consecutive OFDM symbols.

$$\sigma_{est}^2 = E[|s_k^{(m)} - g_k^{(m)}|^2] \quad \text{[Equation 8]}$$

When Equation 8 is substituted in Equation 7, Equation 7 can be given by Equation 9.

$$\alpha_m = \frac{\sigma_{est}^2 - \sigma_{ref}^2}{\sigma_{est}^2} \qquad \text{[Equation 9]}$$

in the meantime, the noise variance to the samples existing outside the GI, that is, the background noise variance $\sigma_{ref}^2$, can be estimated in a decision-directed channel estimation method by an equalizer 130 of FIG. 8 that will be described later or a decision block (not shown). The background noise variance $\sigma_{ref}^2$ can be estimated using a known predetermined training symbol. Furthermore, in the simplest sub-optimal system, the background noise variance $\sigma_{ref}^2$ can be a fixed value corresponding to the typical noise level at which the system operates without an error.

The GI reuse scheme may be not suitable in an equalizer for a time-varying channel, that is, an equalizer having an ICI cancellation circuit. This is because the GI reuse scheme changes channel modeling used to cancel or compensate for the ICI. That is, the use of the GI reuse scheme changes the variation and characteristic of inter-carrier noise, the conventional ICI scheme that cancels the ICI based on the variation and characteristic cannot be used at the same time with the GI reuse scheme. To this end, the present invention provides a method and apparatus for enable the simultaneous use of the GI reuse scheme and the conventional ICI scheme.

According to the ICI cancellation scheme in some embodiments, a received signal after a DFT process, for example, an FFT (fast Fourier transform), can be expressed as follows.

$$R = Fr = \Lambda S + W \qquad \text{[Equation 10]}$$

F is a DFT column, $R=[R_0 \ldots R_{N-1}]^T$, $r=[r_0 \ldots r_{N-1}]^T$, and $S=[S_0 \ldots S_{N-1}]^T$. Also, $W=[W_0 \ldots W_{N-1}]^T$ is AWGN (additive white Gaussian noise) in a frequency domain and $\Lambda$ is a channel matrix. The elements of the channel matrix can be expressed as $[\Lambda]_{d,k}=\lambda(d-k,k)$.

$$\lambda(d, k) = \frac{1}{N}\sum_{n=0}^{N-1}\sum_{m=0}^{N-1} h_m(n) e^{-j2\pi(mk+dn)/N} \qquad \text{[Equation 11]}$$

For example, $\lambda(0,:)$, $\lambda(+1,:)$, and $\lambda(-1,:)$ are the main diagonal vector of the channel matrix, the first lower sub-diagonal vector of the channel matrix, and the first upper sub-diagonal vector of the channel matrix.

In some embodiments according to the invention, a serial MMSE equalizer using a Q-banded column structure can be utilized. However, embodiments according to the present invention are not limited thereto. For example, any one of the serial MMSE, the full-MMSE, and the L-order MMSE methods can be used. The serial equalizer discards information based on subcarriers located far away while separately equalizing the subcarriers. The operation can be expressed as follows.

$$R_k = [R_{k-Q} \ldots R_{k+Q}]^T$$

$$\Lambda_k = \begin{bmatrix} \lambda_{k-Q,k-2Q} & \cdots & \lambda_{k-Q,k} & \\ & \ddots & \vdots & \ddots \\ & & \lambda_{k+Q,k} & \cdots & \lambda_{k+Q,k+2Q} \end{bmatrix}$$

$$\lambda_k = [\lambda_{k-Q,k} \ldots \lambda_{k+Q,k}]^T$$

Also, the serial equalizer performs the operation expressed by the following equations:

$$\hat{S}_k = f_k^H R_k, \quad k=0,1,\ldots,N_{used} \qquad \text{[Equation 12]}$$

$$f_k = (\sigma^2 I_{2Q} + \Lambda_k \Lambda_k^H)^{-1} \lambda_k \qquad \text{[Equation 13]}$$

where $N_{used}$ is the number of an active subcarrier, that is, subcarriers including actual information. As shown in Equation 13, a channel matrix $\Lambda$ is needed to obtain a signal after the equalization. To obtain the channel matrix $\Lambda$, the channel modeling is used to provide accurate channel estimation. However, when the GI reuse scheme is used, the characteristic of channel may change as described above. Thus, when the conventional channel modeling is used as it is, the ICI cancellation scheme may not perform according to its function.

Channel modeling according to some embodiments is described below. It will be understood that, the channel variation, to simplify the channel estimation, is modeled to a single slope linear model in the frequency domain. Also, it is assumed that a GI reuse scheme is used in the OFDM receiver. Thus, the equalizer of the OFDM receiver considers the channel variation according to the GI reuse scheme.

First, channel coefficients $\overline{H}_k^{(i)}$ can be defined. In $\overline{H}_k^{(i)}$, k is the subcarrier index and i the index of the OFDM symbol. The channel coefficients can be obtained by a conventional static equalizer and method. In some embodiments accord to the present invention, the channel coefficients $\overline{H}_k^{(i)}$ are assumed to correspond to the channel coefficient in the middle of the overall OFDM symbol including the reused portion of the GI section (hereinafter, referred to as the $N'_{GI}$).

Figure 5:
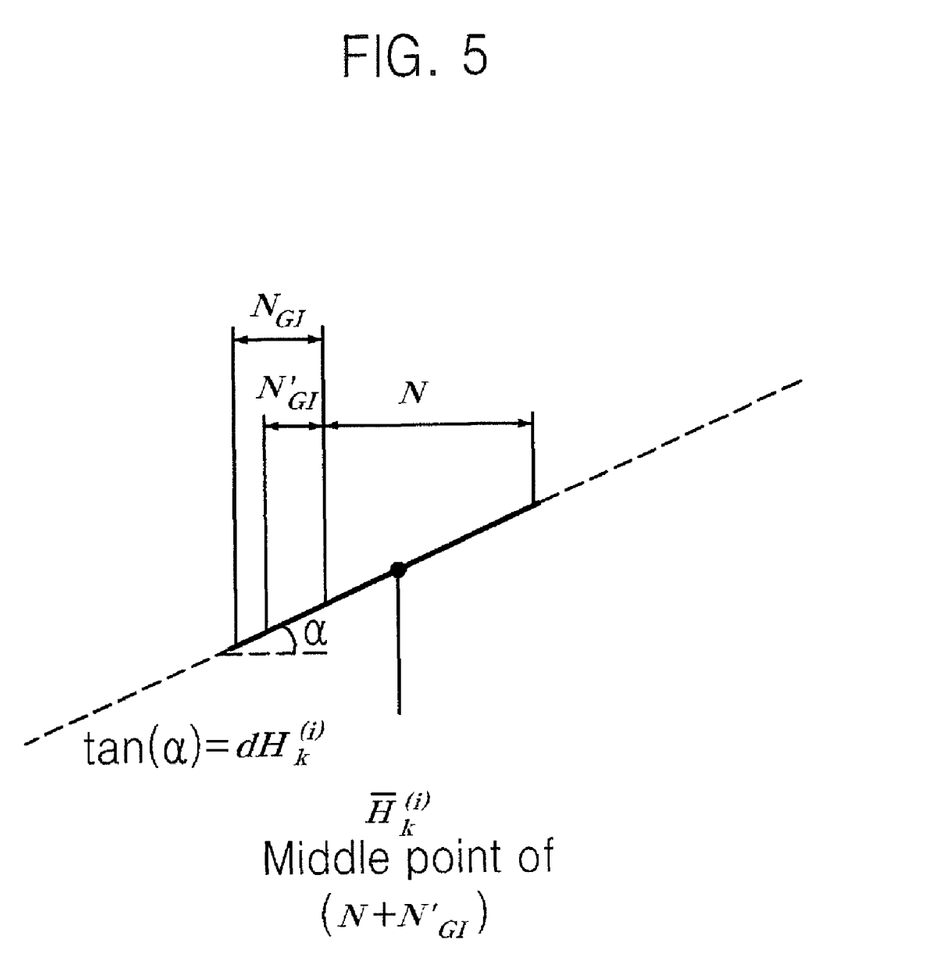
FIG. 5 illustrates relationships between channel parameters in some embodiments according to the invention.

FIG. 5 shows the relationship between the channel parameters.

Referring to FIG. 5, it can be seen that the $\overline{H}_k^{(i)}$ is a channel coefficient at a middle point of the section from $N'_{GI}$ to N. In general, the $N'_{GI}$ can be shorter than $N_{GI}$ (the length of the GI section). This is because the earlier portion of $N_{GI}$ is not actually reused due to the noise or effect of the preceding OFDM symbol. For example, in FIG. 3, the weighting coefficient corresponding to the earlier portion of $N_{GI}$ can be set to 1. Also, referring to FIG. 5, it can be seen that the channel slope is $\tan(\alpha)=dH_k^{(i)}$. In some embodiments according to the invention, the channel coefficient $H_k^{(i)}(n)$ according to the time-varying in a single OFDM symbol is assumed to be approximated to a single slope linear model.

Figure 6:
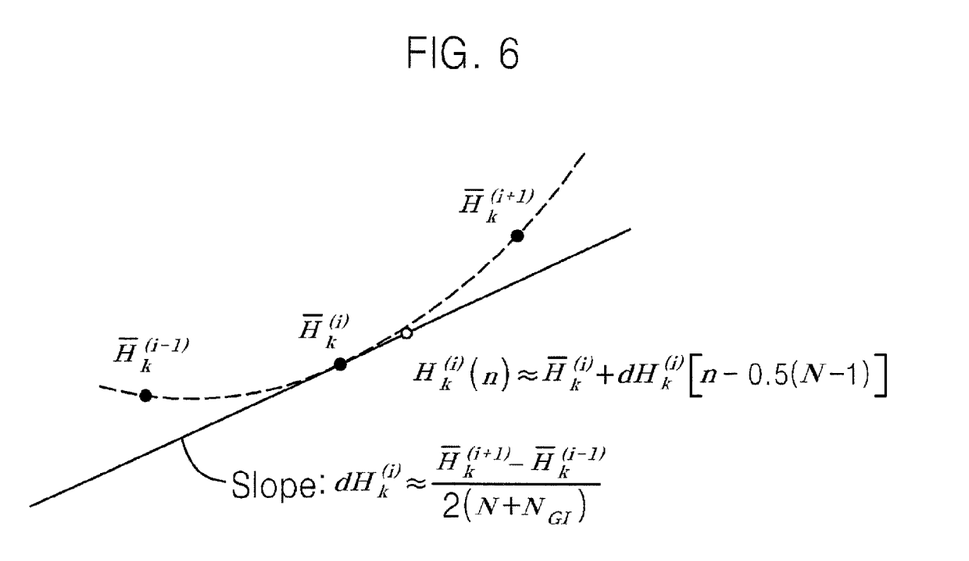
FIG. 6 illustrates channel parameter in some embodiments according to the invention.

FIG. 6 schematically shows the channel parameters. Referring to FIG. 6, under the assumption of a single slope linear model, $dH_k^{(i)}$ can be approximated to a value obtained by dividing the difference value between the channel coefficient $\overline{H}_k^{(i+1)}$ of the subsequent OFDM symbol and the channel coefficient $\overline{H}_k^{(i-1)}$ of the preceding OFDM symbol by a value of a corresponding period length $2(N+N_{GI})$. Also, a function corresponding to the linear model as shown in FIG. 5 can be expressed as $H_k^{(i)}(n) \approx \overline{H}_k^{(i)} + dH_k^{(i)}[n-0.5(N-1)]$. That is, the channel variation slope at the subcarrier k is as follows:

$$dH_k^{(i)} \approx \frac{\overline{H}_k^{(i+1)} - \overline{H}_k^{(i-1)}}{2(N+N_{GI})} \qquad \text{[Equation 14]}$$

In the single slope model, it can be seen that $H_k(n)(0.5N)=\overline{H}_k$, where i is omitted herein for the convenience of explanation. Also, when the GI reuse scheme is used, since the channel response in the section where n<0 is combined with the channel response of N−n, the overall $H_k(N)$ can be expressed as follows (assuming that the weighting coefficient $\alpha_m$ is approximately 0.5 during reusable portion of the guard interval $N'_{GI}$):

$$H_k(n) = \begin{cases} \overline{H}_k + dH_k[n - 0.5(N - N'_{GI} - 1)], & 0 \leq n \leq N - N'_{GI} - 1 \\ \overline{H}_k + 0.5dH_k[n - 0.5(N - N'_{GI} - 1)] + \\ 0.5dH_k[n - 0.5(N - N'_{GI} - 1) - N], & N - N'_{GI} \leq n \leq N - 1 \end{cases}$$ [Equation 15]

[Equation 15]
When Equation 15 is simplified, the following equation can be obtained:

$H_k(n) =$ [Equation 16]

$$\begin{cases} \overline{H}_k + dH_k[n - 0.5(N - N'_{GI} - 1)], & 0 \leq n \leq N - N'_{GI} - 1 \\ \overline{H}_k + dH_k[n - 0.5(2N - N'_{GI} - 1)], & N - N'_{GI} \leq n \leq N - 1 \end{cases}$$

Figure 7:
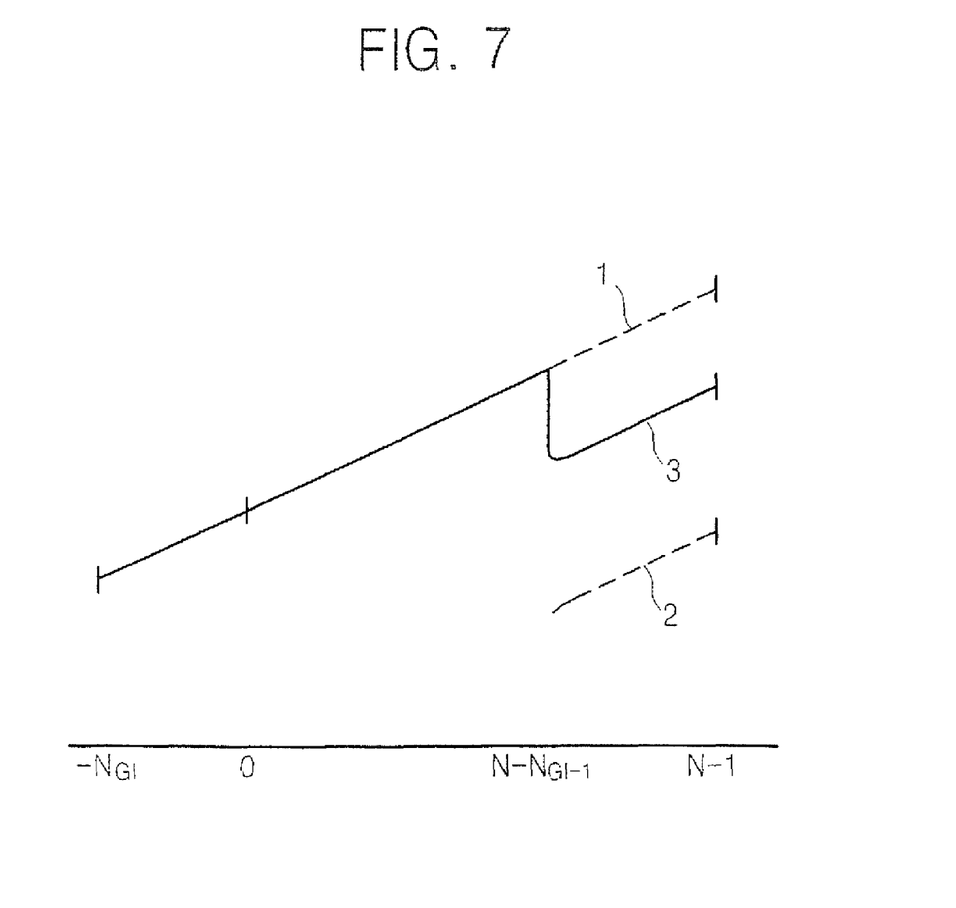
FIG. 7 illustrates channel modeling in some embodiments according to the invention.

[Equation 16]
FIG. 7 is a conceptual view showing Equation 15. Referring to FIG. 7, one OFDM symbol can be divided into an active OFDM symbol section ($0 \leq n \leq N-1$) and a reuse section of the GI section ($-N'_{GI} \leq n \leq 0$). The non-duplicate section ($0 \leq n \leq N-N'_{GI}-1$) of the OFDM symbol section has no difference from the conventional channel modeling and a channel coefficient function corresponding thereto is:

$\overline{H}_k + dH_k[n-0.5(N-N'_{GI}-1)]$.

However, the channel response (1) corresponding to the duplicate section of the OFDM symbol section ($N-N'_{GI} \leq n \leq N-1$) is combined with the channel response (2) corresponding to the reuse section of the GI section ($-N'_{GI} \leq n \leq 0$) to provide a new form of a channel response (3) as shown in FIG. 7. Consequently, the channel coefficient function corresponding to the new channel response (3) is $\overline{H}_k + dH_k[n-0.5(2N-N'_{GI}-1)]$. Thus, the new channel model of Equation 9 is considered in obtaining parameters to obtain the channel matrix. In particular, when the main diagonal vector and the first lower/upper sub-diagonal vectors are obtained based on Equation 16:

$$\lambda(0, k) = \frac{1}{N}\sum_{n=0}^{N-1} H_k(n) = \overline{H}_k$$ [Equation 17]

$$\lambda(1, k) = \frac{1}{N}\sum_{n=0}^{N-1} H_k(n)e^{-j2\pi n/N} = \xi_1 dH_k$$ [Equation 18]

$$\lambda(-1, k) = \frac{1}{N}\sum_{n=0}^{N-1} H_k(n)e^{j2\pi n/N} = \xi_1^* dH_k$$ [Equation 19]

$$\xi_1 = \sum_{n=0}^{N-N'_{GI}-1} [n - 0.5(N - N'_{GI} - 1)]e^{-j2\pi n/N} + \sum_{n=N-N'_{GI}}^{N-1} [n - 0.5(2N - N'_{GI} - 1)]e^{-j2\pi n/N} = \frac{1 + e^{-j2\pi N'_{GI}/N}}{2[e^{j2\pi/N} - 1]}$$ [Equation 20]

To simplify Equation 20, the real number portion and the imaginary number portion of $\xi_1$ can be expressed as:

$$\text{Re}(\xi_1) = -\frac{1}{4}\left(\frac{\sin[\pi(2N'_{GI}+1)/N]}{\sin[\pi/N]} + 1\right),$$ [Equation 21]

$$\text{Im}(\xi_1) = -\frac{1}{4}\left(\frac{\cos[\pi(2N'_{GI}+1)/N]}{\sin[\pi/N]} + \frac{1}{\tan[\pi/N]}\right)$$

When Q is greater than 1, $\xi_q$ is obtained as follows.

$$\xi_q = \frac{1 + e^{-j\frac{2\pi q N'_{GI}}{N}}}{2\left[e^{j\frac{2\pi q}{N}} - 1\right]}$$ [Equation 22]

When the GI section is not reused, $N'_{GI}=0$. Thus, when $N'_{GI}=0$ is substituted in Equation 15, $\xi_q$ is the same as that in the scheme that does not reuse the convention GI section. Consequently, in the equalizer according to the present embodiment, Equation 22 can be considered when the equalization is performed.

Figure 8:
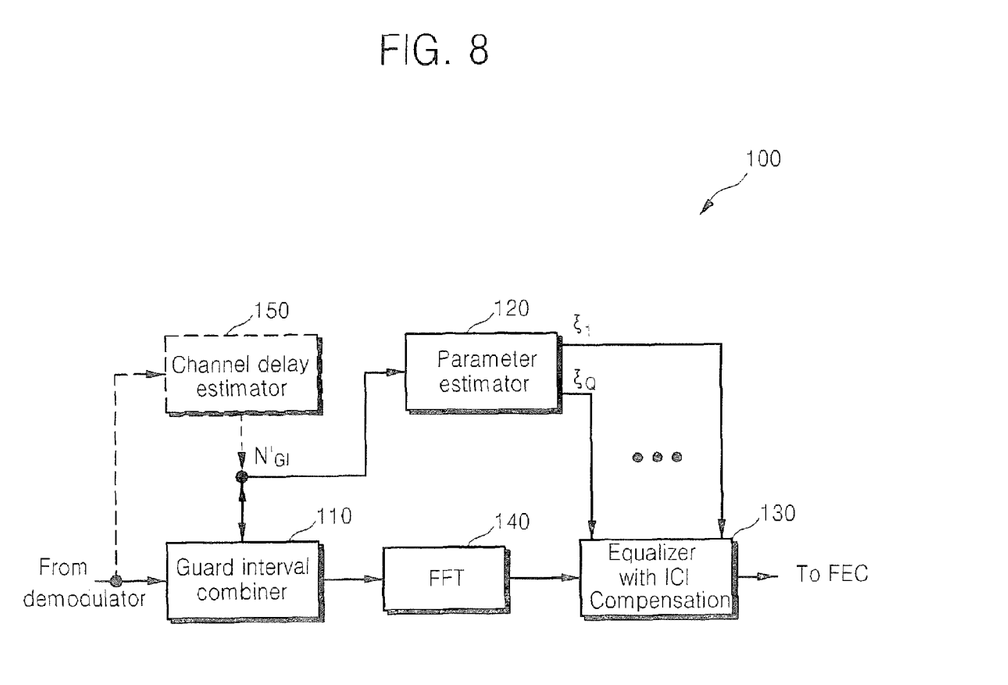
FIG. 8 is a block diagram of an OFDM receiver circuit in some embodiments according to the invention.

FIG. 8 is a functional block diagrams of an OFDM receiver circuit in some embodiments according to the present invention. Referring to FIG. 8, an OFDM receiver 100 includes the GI combiner 110, a channel parameter estimator 120, an equalizer 130, and an FFT portion 140. The OFDM receiver 100 can further comprise a channel delay estimator 150.

The GI combiner 110 does not discard the GI but adaptively combines the data in the GI with the data in a predetermined section 30 of an active OFDM symbol. The GI combiner 110 can perform the operations described with reference to FIGS. 3 and 4. The combined digital signal is output to the FFT portion 140, which converts the received digital signal to the frequency domain and outputs the signal converted to the frequency domain. The equalizer 130 receives the signal converted to the frequency domain and performs equalization by canceling the ICI of the received signal. The equalizer 130 receives information on the channel parameters, for example, $\xi_1 \ldots \xi_q$, from the channel parameter estimator 120 and performs equalization using the information on the received channel parameters.

In some embodiments according to the invention, the OFDM receiver circuit can include a channel parameter estimator 120 that is configured to perform the operations of Equation 22. When the channel delay estimator 150 is included, the channel parameter estimator 120 receives the information $N'_{GI}$ on the GI reuse section from the channel delay estimator 150 and performs the operation of Equation 22 based on the received information to output a result of the operation to the equalizer 130. When the channel delay estimator 150 is not provided, the channel parameter estimator 120 receives the information $N'_{GI}$ on the GI reuse section from the combiner 110. It will be understood that, as used herein, the term "channel delay information" refers to channel delay values provided by the combiner circuit and/or the channel delay estimator circuit.

In some embodiments according to the present invention, the channel delay estimator 150 estimates the channel impulse response delay. When the maximum channel delay corresponds to the widely known "a priori", the channel delay estimator 150 may be excluded from the OFDM receiver.

The equalizer 130 can include not only the above-described serial MMSE equalizer but also an equalizer using the ICI cancellation scheme as it is disclosed in References [1]-[7] and can be an equalizer which can equalize the channel using the channel parameters $\xi_1 \ldots \xi_q$, for example, the full-MMSE, L-order Linear MMSE, DFE (decision feedback equalizer), or a combination thereof.

Figure 9:
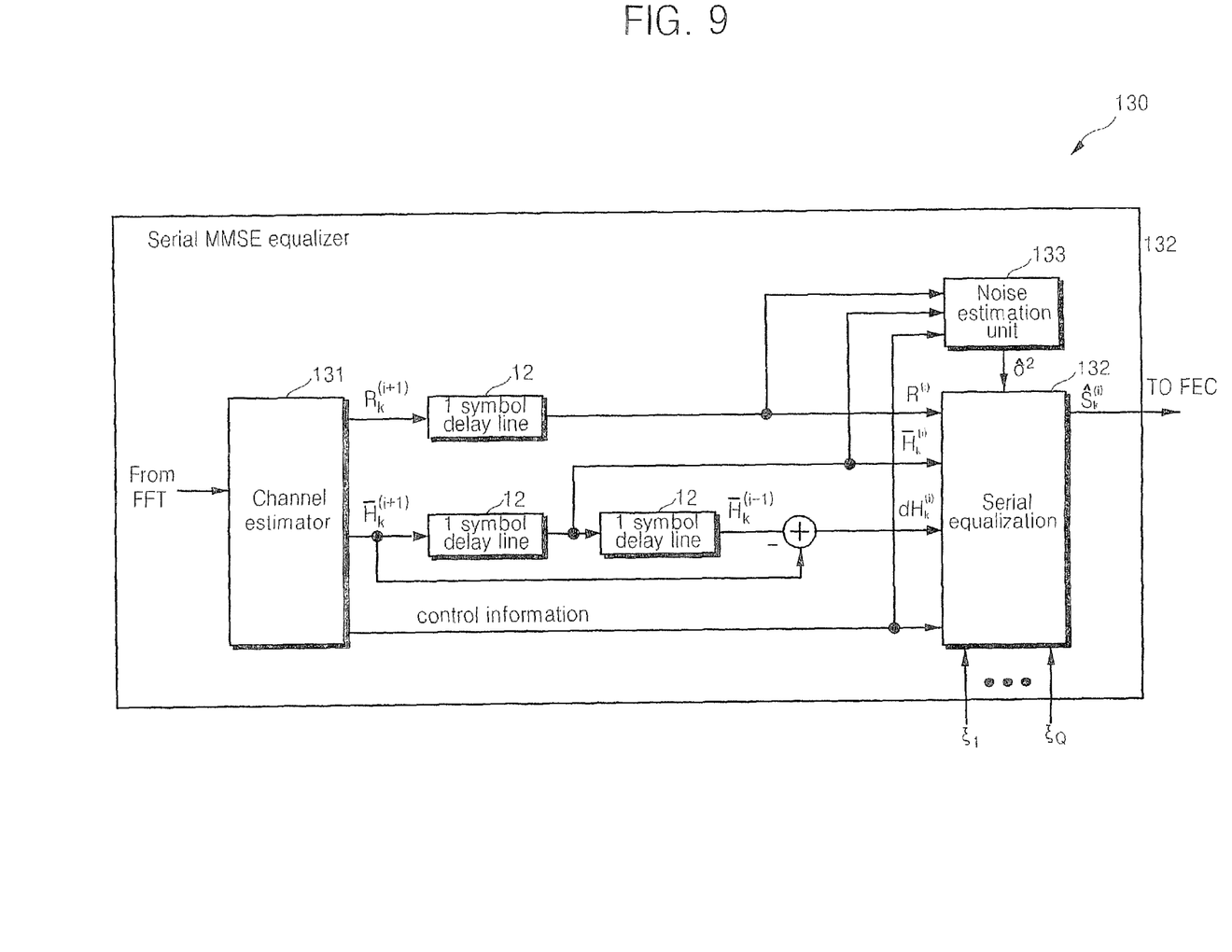
FIG. 9 is a block diagram of an equalizer circuit in some embodiments according to the invention.

An example of the above equalizers is illustrated in FIG. 9. FIG. 9 is a functional block diagram of an equalizer according to an embodiment of the present invention. Referring to FIG. 9, the equalizer 130 is briefly described below. The equalizer 130 includes a channel estimator 131, a noise estimator 133, and an equalizer 132. Also, the equalizer 130 may further include at least one delay device and a predetermined number of operation devices. The channel estimator 131 receives the signal converted to the frequency domain and outputs signals $\overline{H}_k^{(i+1)}$ and $R_k^{(i+1)}$.

The equalizer 130 can obtain the signals $\overline{H}_k^{(i)}$ and $dH_k^{(i)}$ using the at least one delay devices based on the signal $\overline{H}_k^{(i+1)}$. That is, the signal $\overline{H}_k^{(i)}$ can be obtained by delaying the $\overline{H}_k^{(i+1)}$ as long as one OFDM symbol. The signal $dH_k^{(i)}$ can be obtained by Equation 14 and the signal $\overline{H}_k^{(i-1)}$ that is obtained by delaying the $\overline{H}_k^{(i+1)}$ as long as two OFDM symbols.

The signal $R_k^{(i)}$ can be obtained by delaying the signal $R_k^{(i+1)}$ as long as one OFDM symbol. Also, the noise estimator 133 can calculate and output AWGN based on the signals $\overline{H}_k^{(i)}$ and $R_k^{(i)}$. For example, there are a variety of noise calculation methods. For example, the noise estimation can be made based on reference information included in continual pilots and can be given by the following equation.

$$\hat{\sigma}^2 = \frac{1}{L}\sum_{l=0}^{L-1}\left(\hat{H}_{CP(l)} - w_{CP(l)}^* R_{CP(l)}\right)^2 \quad \text{[Equation 23]}$$

$\hat{H}_{CP(l)}$ is the interpolated channel estimation signal at the l-th position of the continual pilots. $w_{CP(l)}$ is the value of PRBS (pseudo random binary sequence). CP(l) is the index value of the l-th continual pilot. That is, the noise estimator 133 performs the operation of Equation 23 and outputs the operation to the equalizer 132.

The equalizer 132 performs the operations of Equations 12 and 13 based on the input signals and outputs the equalized signal to a decoding apparatus (not shown). The equalizer 132 receives the information on the channel parameters, for example, $\xi_1 \ldots \xi_q$, output from the channel parameter estimator 120 and performs equalization using the received information on the channel parameters. Also, it is well known to those skilled in the art to which the present invention pertains that a variety of methods can be used to obtain an averaged interpolated channel estimates $\overline{H}_k^{(i)}$.

While this invention has been particularly shown and described with reference to embodiments thereof, it will be understood by those skilled in the art that various changes in form and details may be made therein without departing from the spirit and scope of the invention as defined by the appended claims.

What is claimed:

1. An OFDM (orthogonal frequency-division multiplexing) receiver circuit comprising:
   a GI (Guard Interval) combiner circuit configured to combine a signal including at least a portion of a GI included in an OFDM received signal and a signal of a duplicate section of the OFDM received signal corresponding to the portion of the GI to provide a combined signal;
   a channel parameter estimator circuit configured to estimate a channel parameter value based on channel delay information;
   an FFT (Fast Fourier Transform) circuit configured to receive the combined signal output from the GI combiner circuit and configured to convert the combined signal to a frequency domain to provide a converted signal; and
   an equalizer circuit configured to equalize the converted signal output from the FFT circuit based on the channel parameter value output from the channel parameter estimator circuit, wherein the channel parameter estimator circuit estimates the channel parameter value according to:

$$\xi_q = \frac{1 + e^{-j\frac{2\pi q N'_{GI}}{N}}}{2\left[e^{j\frac{2\pi q}{N}} - 1\right]}$$

where $N'_{GI}$ is the length of a section corresponding to the at least a portion of the signal of the GI, q is greater than or equal to 1 and N is a length of the FFT.

2. The OFDM receiver of claim 1, further comprising:
   a channel delay estimator circuit configured to provide a channel delay of the OFDM received signal comprising the channel delay information to the channel parameter estimator circuit.

3. The OFDM receiver of claim 1, wherein the channel delay information is provided to the channel parameter estimator circuit by the GI combiner circuit.

4. The OFDM receiver of claim 1, wherein each of the duplicate section and the GI is divided into M sections, where M is a natural number not less than 1, and the GI combiner circuit comprises:
   a weighting coefficient estimator circuit configured to provide a weighting coefficient corresponding to each section of the duplicate section; and
   a combining circuit configured to combine a signal from each section of the duplication section with a signal from the GI corresponding thereto using the weighting coefficient to provide the combined signal.

5. The OFDM receiver of claim 4, wherein the weighting coefficient comprises a value that maximizes a signal-to-noise ratio of the combined signal.

6. The OFDM receiver of claim 1, wherein the equalizer circuit comprises an Inter-Carrier Interference (ICI) cancellation circuit that includes a serial Minimum Mean Square Error (MMSE) equalizer, a full-MMSE equalizer, an L-order MMSE equalizer, and/or a DFE (Decision Feedback Equalizer).

7. A method of receiving a signal formatted using OFDM (Orthogonal Frequency-Division Multiplexing), the method comprising:
   combining a signal of at least a portion of a GI (Guard Interval) included in an OFDM received signal and a signal of a duplicate section of the received OFDM signal corresponding to the portion of the GI to provide a combined signal;
   estimating a channel parameter value based on channel delay information; and
   equalizing the combined signal based on the channel parameter value, wherein the estimating of the channel parameter value comprises:

$$\xi_q = \frac{1 + e^{-j\frac{2\pi q N'_{GI}}{N}}}{2\left[e^{j\frac{2\pi q}{N}} - 1\right]}$$

where $N'_{GI}$ is the length of a section corresponding to the at least a portion of the signal of the GI, q is greater than or equal to 1 and N is a length of an FFT.

8. The OFDM receiving method of claim 7, further comprising:
estimating channel delay of the OFDM received signal; and
determining the signal of the portion of the GI based on a result of the estimation.

9. The OFDM receiving method of claim 7, wherein each of the duplicate section and the GI is divided into M-number of sections, where M is a natural number not less than 1, and the combining of the signals comprises:
producing a weighting coefficient corresponding to each section of the duplicate section; and
combining a signal of each section of the duplication section with a signal of the GI corresponding thereto using the weighting coefficient and outputting the combined signal.

10. The method of claim 9, wherein the weighting coefficient comprises a value that maximizes a signal-to-noise ratio of the combined signal.

11. The method of claim 7, wherein the equalizer comprises an Inter-Carrier Interference (ICI) cancellation circuit that includes a serial Minimum Mean Square Error (MMSE) equalizer, a full-MMSE equalizer, an L-order MMSE equalizer, and/or a DFE (Decision Feedback Equalizer).

12. An OFDM (orthogonal frequency-division multiplexing) receiver circuit comprising:
a GI (Guard Interval) combiner circuit configured to adaptively combine data in the GI of an OFDM formatted signal with data included in a predetermined section of an active OFDM symbol, wherein the receiver circuit is configured to estimate a channel parameter value based on channel delay information, wherein the estimating of the channel parameter value comprises:

$$\xi_q = \frac{1 + e^{-j\frac{2\pi q N'_{GI}}{N}}}{2\left[e^{j\frac{2\pi q}{N}} - 1\right]}$$

where $N'_{GI}$ is the length of a section corresponding to the data in the GI, q is greater than or equal to 1 and N is a length of an FFT.

* * * * *

UNITED STATES PATENT AND TRADEMARK OFFICE
CERTIFICATE OF CORRECTION

PATENT NO.        : 8,000,417 B1
APPLICATION NO.   : 11/945763
DATED             : August 16, 2011
INVENTOR(S)       : Zhidkov et al.

Page 1 of 1

It is certified that error appears in the above-identified patent and that said Letters Patent is hereby corrected as shown below:

In the Claims:

Column 14, Claim 2, Line 19: Please correct "The OFDM receiver of claim 1"
to read -- The OFDM receiver circuit of claim 1 --

Claim 3, Line 24: Please correct "The OFDM receiver of claim 1"
to read -- The OFDM receiver circuit of claim 1 --

Claim 4, Line 27: Please correct "The OFDM receiver of claim 1"
to read -- The OFDM receiver circuit of claim 1 --

Claim 5, Line 37: Please correct "The OFDM receiver of claim 4"
to read -- The OFDM receiver circuit of claim 1 --

Claim 6, Line 40: Please correct "The OFDM receiver of claim 1"
to read -- The OFDM receiver circuit of claim 1 --

Column 15, Claim 8, Line 1: Please correct "The OFDM receiving method of"
to read -- The method of --

Claim 9, Line 7: Please correct "The OFDM receiving method of"
to read -- The method of --

Signed and Sealed this
Eleventh Day of October, 2011

David J. Kappos
*Director of the United States Patent and Trademark Office*

UNITED STATES PATENT AND TRADEMARK OFFICE
CERTIFICATE OF CORRECTION

PATENT NO.        : 8,000,417 B1
APPLICATION NO.   : 11/945763
DATED             : August 16, 2011
INVENTOR(S)       : Zhidkov et al.

It is certified that error appears in the above-identified patent and that said Letters Patent is hereby corrected as shown below:

In the Claims:
Column 14, Claim 5, Line 37: Please correct "The OFDM receiver circuit of claim 1"
to read -- The OFDM receiver circuit of claim 4 --

Signed and Sealed this
Twenty-second Day of November, 2011

David J. Kappos
*Director of the United States Patent and Trademark Office*